(12) United States Patent
Kawahara et al.

(10) Patent No.: US 6,800,687 B2
(45) Date of Patent: Oct. 5, 2004

(54) METHOD AND APPARATUS FOR PRODUCING ETHYLENE-VINYL ACETATE COPOLYMER SAPONIFICATION PRODUCT

(75) Inventors: Takaharu Kawahara, Okayama (JP); Yukihiro Ohara, Okayama (JP); Toshio Tuboi, Okayama (JP); Tetsuya Hikasa, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 129 days.

(21) Appl. No.: 10/221,725

(22) PCT Filed: Dec. 19, 2001

(86) PCT No.: PCT/JP01/11121

§ 371 (c)(1),
(2), (4) Date: Sep. 16, 2002

(87) PCT Pub. No.: WO02/50137

PCT Pub. Date: Jun. 27, 2002

(65) Prior Publication Data

US 2003/0050410 A1 Mar. 13, 2003

(30) Foreign Application Priority Data

Dec. 20, 2000 (JP) ........................ 2000-387671

(51) Int. Cl.⁷ ................................. C08F 8/00
(52) U.S. Cl. .......................... 525/60; 525/62
(58) Field of Search ..................... 525/60, 62

(56) References Cited

U.S. PATENT DOCUMENTS

| 3,560,461 | A |   | 2/1971 | Yonezu et al. |
| 4,611,029 | A |   | 9/1986 | Takahashi |
| 5,047,469 | A | * | 9/1991 | Kitamura et al. ............. 525/56 |
| 5,240,997 | A | * | 8/1993 | Yanai et al. ................... 525/60 |

FOREIGN PATENT DOCUMENTS

| JP | 43-14958 | 6/1968 |
| JP | 45-34152 | 11/1970 |
| JP | 48-43493 | 6/1973 |
| JP | 53-9897 | 1/1978 |
| JP | 58-122903 | 7/1983 |
| JP | 60-192705 | 10/1985 |
| JP | 9-67411 | 3/1997 |

OTHER PUBLICATIONS

Patent Abstracts of Japan, JP 60–192705, Oct. 1, 1985.

Patent Abstracts of Japan, JP 58–122903, Jul. 21, 1883.

* cited by examiner

Primary Examiner—Bernard Lipman
(74) Attorney, Agent, or Firm—Oblon, Spivak, McClelland, Maier & Neustadt, P.C.

(57) ABSTRACT

A method for producing a saponified ethylene-vinyl acetate copolymer (EVOH) comprises: supplying into a second reactor a solution containing the copolymer that is saponified partially with an alkali catalyst under a predetermined pressure in a first reactor; and saponifying further the partially-saponified copolymer in the second reactor under a pressure higher than the predetermined pressure in the first reactor. According to the method, an EVOH having a high saponification degree can be produced efficiently with a small amount of alkali catalyst.

14 Claims, 1 Drawing Sheet

METHOD AND APPARATUS FOR
PRODUCING ETHYLENE-VINYL ACETATE
COPOLYMER SAPONIFICATION PRODUCT

TECHNICAL FIELD

The present invention relates to a method and an apparatus for producing a saponified ethylene-vinyl acetate copolymer (hereinafter abbreviated as "EVOH").

BACKGROUND ART

In production of an EVOH by saponification of an ethylene-vinyl acetate copolymer (hereinafter abbreviated as "EVAc"), it has been an object for a person skilled in the art to produce efficiently an EVOH having a high saponification degree in a short time. For this object, various methods have been proposed. Specifically, known methods include a method of saponifying EVAc in a methanol solution in the presence of an alkali catalyst in a tower reactor (Japanese Published Examined Patent Application No. Sho 43(1968)-14958); a method of saponifying an EVAc in a methanol solution in the presence of an alkali catalyst and further saponifying (re-saponifying) the EVAc in an aqueous solution of at least 50° C. in the presence of an alkali catalyst (Japanese Published Examined Patent Application No. Sho 45(1970)-34152); and a method using a mixture of a water-soluble lower alcohol and water as a solvent for re-saponification (Japanese Published Unexamined Patent Application/JP-A No. Sho 48(1973)-43493. In the methods including re-saponification, a partially-saponified product separated from a reaction solution by means of centrifugation or the like is introduced into a separate solvent in which saponification is carried out again.

An alkali catalyst used for saponification of EVAc may cause degradation of the polymer such as caustic-soda corrosion or coloring. An acetic acid compound as a by-product remaining in the product will reduce the thermal stability, and cause coloring and generation of gels and hard spots. It is therefore desirable to decrease the amount of the alkali catalyst used. However, since simply decreasing the amount of the alkali catalyst used will lower the rate of the saponification in the above-described conventional methods, this decrease in the amount used should be limited.

Since the solubility of an EVAc having a low ethylene content in a saponification solvent such as methanol decreases as the saponification proceeds, a reaction under conditions of high temperature and high pressure temperature and high pressure apparently increases the above-described by-product, coloring and generation of hard spots.

DISCLOSURE OF INVENTION

After keen studies in view of the above issues, the inventors found that an EVOH having a high saponification degree can be produced efficiently with an alkali catalyst used in a smaller amount when compared to conventional methods, by selecting reaction conditions suitable to respective stages during saponification corresponding to differences in reaction mechanisms between initial stages and final stages of EVAc saponification, and to variations in solubility of the EVOH with respect to the solvent depending on the progress of saponification. While this method is applicable regardless of the ethylene content, it is particularly effective when applied to an EVOH having a small ethylene content.

Specifically, the present invention provides a method for producing an EVOH by saponification in a methanol solution containing an alkali catalyst, the method including supplying a solution containing a partially-saponified product of EVAc, obtained by saponification in a first reactor under a predetermined pressure, from the first reactor to a second reactor, and saponifying further the partially-saponified product in the second reactor under a pressure higher than the predetermined pressure in the first reactor so as to provide a final saponified EVAc product.

According to the method of the present invention, consumption of an alkali catalyst is suppressed in an initial stage of saponification of EVAc, and the saponification can proceed even in a final stage of the saponification. This method does not require an operation to separate a partially-saponified product from a reaction solution and introducing this partially-saponified product into a separate solvent. Therefore, an EVOH having a high saponification degree can be produced efficiently with a small amount of alkali catalyst.

It is preferable in the method that the ethylene content of the EVAc is from 10 mol % to 60 mol %, and more preferably, from 10 mol % to 30 mol %. As mentioned above, saponification of an EVAc having a lower ethylene content according to a conventional method will cause problems of by-products such as acetic acid compound, coloring and generation of hard spots. Since this method requires less alkali catalyst, these problems can be avoided easily.

In the method of the present invention, preferably a pressure in the first reactor is from 0.1 MPa to 0.2 MPa, and a pressure in the second reactor is from 0.2 MPa to 2.0 MPa. A preferable saponification degree of the partially-saponified product to be supplied to the second reactor is from 60 mol % to 98 mol %. It is preferable that the saponification degree of the final saponified product is raised to 99.0 mol % or higher.

In the method of the present invention, an alkali catalyst can be used in a range from 0.01 to 0.03 in molar ratio to an acetyl group in the EVAc. If the amount of the alkali catalyst is excessive, visible imperfections such as coloring, generation of gels and hard spots and fish-eyes might occur.

The alkali catalyst can be supplied to the first reactor alone, or it can be supplied to both the first reactor and the second reactor. Supplying to only the first reactor is advantageous in ease of controlling the total amount of the alkali catalyst used. Supplying to both the first and second reactors is advantageous in reducing the total amount of the alkali catalyst used.

When supplying the alkali catalyst to the first reactor alone, it is preferable that a solution supplied from the first reactor to the second reactor contains the alkali catalyst in a range from 0.005 to 0.03 in molar ratio to an acetyl group contained in the partially-saponified product. An excessive amount of alkali catalyst may lead to the above-described imperfections. On the contrary, when the amount is insufficient, saponification in the second reactor may not proceed sufficiently.

When the alkali catalyst is supplied to the second reactor as well, the second reactor can be a tower reactor that is divided into at least two regions in a direction from top to bottom thereof, and the alkali catalyst is supplied to the respective regions. Accordingly, the total amount of the alkali catalyst used can be reduced by separately supplying the catalyst to the second reactor.

It is preferable in the method of the present invention that the first reactor and the second reactor are tower reactors. By using tower reactors, saponification of the EVAc can be carried out continuously and efficiently. In this case, a methanol solution of an EVAc and a methanol solution of an alkali catalyst can be supplied through an upper portion of the first reactor, and then, a methanol solution containing a partially-saponified product of the EVAc and the alkali catalyst can be supplied from a lower portion of the first reactor to an upper portion of the second reactor. A methanol solution containing a final saponified product is drawn out from a lower portion of the second reactor. Consumption of the alkali catalyst can be reduced further by supplying a methanol vapor from at least one of the lower portions of the first reactor and the second reactor, and by saponifying while discharging the methanol vapor, along with methyl acetate as a by-product of the saponification, from the upper portion of the reactor to which the methanol vapor is supplied.

An apparatus for producing EVOH in accordance with the present invention is an apparatus for saponifying EVAc in a methanol solution containing an alkali catalyst, and it includes a first reactor having a copolymer supplying pipe through which a methanol solution of EVAc is introduced and a catalyst supplying pipe through which the alkali catalyst is introduced; a second reactor having a final saponified product discharging pipe through which a final saponified product of EVAc is drawn out; a partially-saponified product delivering pipe that connects the first reactor and the second reactor so as to allow a solution to be delivered and supply the partially-saponified product of EVAc from the first reactor to the second reactor; and a pressure-regulating valve for regulating the pressure in the second reactor.

The method of the present invention can be carried out continuously using the apparatus of the present invention. This apparatus is suitable for industrial production of EVOH having a high saponification degree, using a small amount of alkali catalyst.

For the apparatus of the present invention, the first reactor and the second reactor can be tower reactors, where a copolymer supplying pipe and a catalyst supplying pipe are connected to the upper portion of the first reactor, and a final saponified product discharging pipe is connected to the lower portion of the second reactor, and the first reactor is connected at the lower portion to the upper portion of the second reactor via a partially-saponified product delivering pipe. In this case, a methanol vapor supplying pipe can be connected to the lower portion of at least one of the first and second reactors, and a methyl acetate discharging pipe can be connected to the upper portion of the at least one reactor.

PREFERRED EMBODIMENTS OF THE INVENTION

Figure 1:
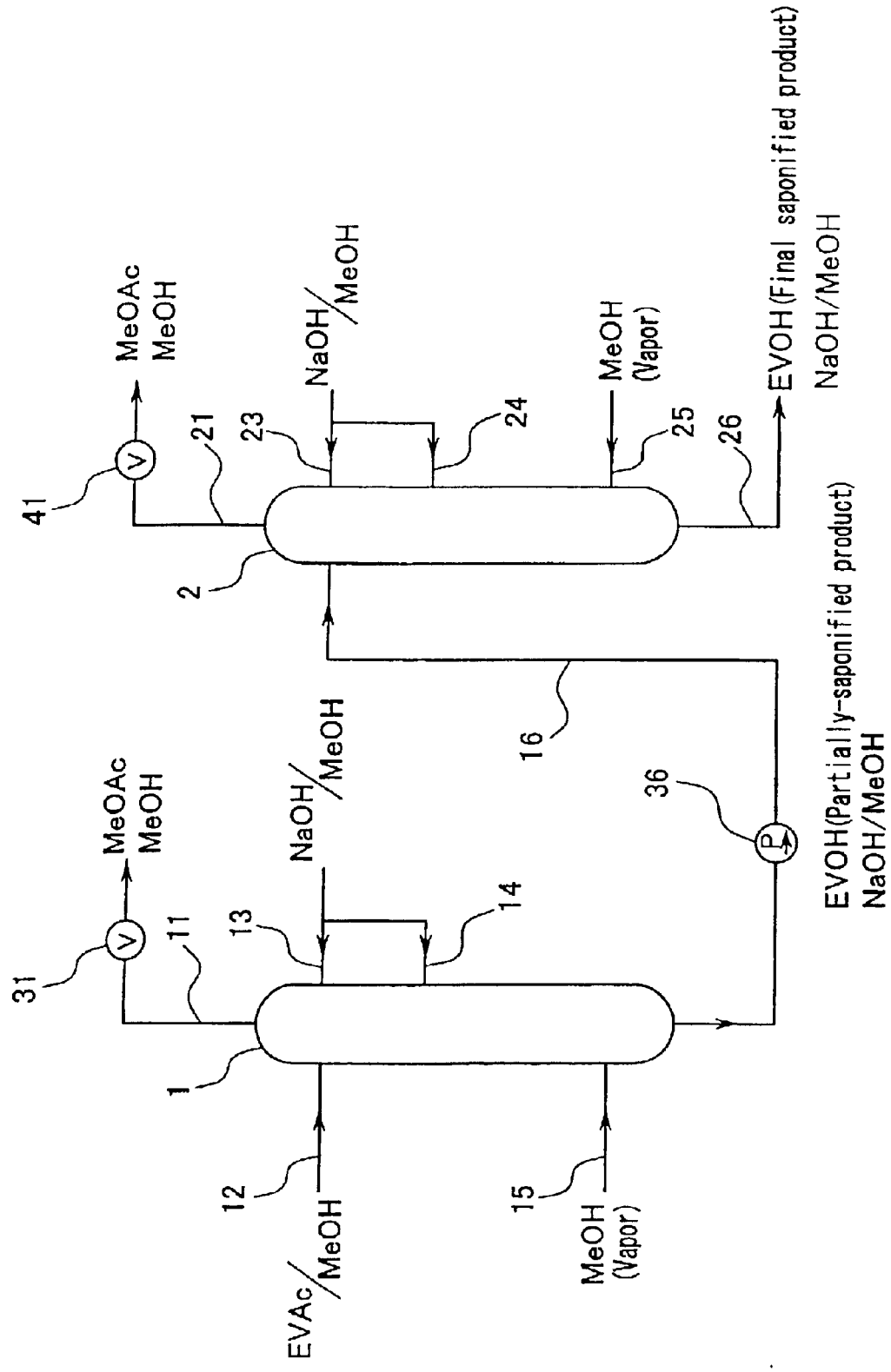
FIG. 1 shows a configuration of an embodiment of a producing apparatus according to the present invention.

In the following, a preferred embodiment of the present invention is described in detail.

An EVOH is difficult to dissolve in methanol especially when the ethylene content is low. For example, an EVOH having an ethylene content of about 50 mol % or less and a saponification degree of at least 99.3 mol % does not dissolve in methanol substantially at or below the boiling point of methanol under atmospheric pressure. By raising pressure in the saponification reactor and by raising the temperature of the methanol to dissolve the EVOH, a methanol solution of EVOH having a saponification degree of at least 99.3 mol % can be obtained. On the other hand, the saponification under high pressure and high temperature will also accelerate consumption of the alkali catalyst, which is caused by methyl acetate as a by-product of the saponification.

The EVOH's solubility with respect to methanol is lowered as saponification proceeds. Therefore, in an initial stage of saponification, the EVOH can be saponified while it is still dissolved in methanol even under a relatively low pressure (e.g., an atmospheric pressure). Considering this, an EVOH having a high saponification degree can be obtained while suppressing consumption of an alkali catalyst, first by carrying out saponification under a relatively low pressure and removing methyl acetate as a by-product, and subsequently continuing the saponification under a relatively high pressure after the solubility of EVOH with respect to methanol is lowered as saponification proceeds. The saponification with a small amount of alkali catalyst can decrease coloring or the like in an EVOH final product.

Saponification in the initial stage is mainly transesterification between EVAc (or EVOH having a low saponification degree) and methanol. This reaction proceeds as a chain-reaction even under atmospheric pressure since substituted hydroxyl groups accelerate release of adjacent acetyl groups. However, in an EVOH having copolymerized ethylene, improvement in the saponification degree provided by this reaction alone is limited. For this reason, a direct saponification will be required for saponifying further a partially-saponified product that has obtained a comparatively high saponification degree. By keeping the methanol at a high temperature and by raising the pressure in a stage where a direct saponification is required, EVOH solubility with respect to the methanol is maintained and also saponification rate can be increased with a minimum increase in alkali concentration. Since the amount of vinyl acetate remaining in a copolymer is small in a stage where saponification has proceeded to some degree, consumption of alkali catalyst is not increased drastically even when the conditions become harsh to accelerate the reaction.

As mentioned above, by adjusting the pressure to be relatively high as saponification proceeds, an EVOH having a high saponification degree can be produced with an extreme efficiency, taking into account the difference of reaction mechanism between initial stages and final stages of saponification and the variation in solubility of EVOH with respect to methanol, where the variation is caused by the progress of saponification.

Since an EVAc can be saponified substantially to a final saponified product in a single solvent according to this method, there is no need for preparing a separate solvent (e.g., an aqueous solution for direct saponification) or conducting filtration or centrifugation for transferring the EVOH to the separate solvent. Therefore, saponification of the EVAc can be carried out continuously using plural reactors with adjusted interior pressures.

Though there is no specific limitation on the ethylene content of the EVAc to be supplied, a preferable range is from 10 mol % to 60 mol %, and more preferably from 10 mol % to 30 mol %. In a comparison with an ordinary saponification method, the improvement becomes remarkable, especially when saponifying an EVAc having an ethylene content in a range from 10 mol % to 30 mol %.

An example of a saponification apparatus comprising a plurality of reactors will be described below referring to FIG. 1. In this saponification apparatus, an EVAc supplying pipe 12 and an alkali catalyst supplying pipe 13 are connected to an upper portion of a first reactor 1, and a methanol vapor supplying pipe 15 is connected to a lower portion thereof. A methyl acetate discharging pipe 11 and a partially-saponified product delivering pipe 16 are connected respectively to a top portion and a bottom portion of the first reactor. This pipe 16 is linked to an upper portion of a second reactor 2 via a pump 36 so as to deliver a solution containing a partially-saponified product to the second reactor 2.

A methyl acetate discharging pipe 21, an alkali catalyst supplying pipe 23 and a methanol vapor supplying pipe 25 are connected to the portions of the second reactor 2 that correspond to the respective portions of the first reactor. A final saponified product discharging pipe 26 is connected to the bottom portion of the second reactor so as to draw out a methanol solution containing a final saponified product.

Alkali catalyst supplying pipes 14 and 24 are connected as well to middle portions of the first reactor and second reactor so as to supply a catalyst from plural positions.

The reactors 1 and 2 are not connected to the outside except via the respective pipes, so that they are substantially sealed when the pipes are closed. Therefore, pressures in the reactors can be adjusted to predetermined levels by adjusting valves 31 and 41 arranged at the methyl acetate discharging pipes 11 and 21. Alternatively, such a pressure-regulating valve can be equipped to the second reactor alone.

The following is an example of a method for continuous saponification of EVAc using this saponification apparatus. In this method, sodium hydroxide is used as an alkali catalyst.

To the upper portion of the first reactor 1, a methanol solution of EVAc (EVAc/MeOH) and a methanol solution of sodium hydroxide (NaOH/MeOH) are supplied through pipes 12 and 13 respectively. For preventing the solution viscosity in the reactor from rising excessively, the EVAc concentration in the supplied methanol solution is preferably in a range from 30 wt % to 60 wt %. The amount of sodium hydroxide to be supplied can be determined suitably so as to correspond to the ethylene content of the EVAc, the desired saponification degree or the like. The following description refers to an example in which the alkali catalyst is supplied to the second reactor as well. When sodium hydroxide is supplied to the first reactor alone, the amount is adjusted so that hydroxyl groups will remain in the solution in the delivering pipe 16 in a range from 0.005 to 0.03 in molar ratio to an acetyl group contained in the partially-saponified product.

A methanol (eOH) vapor is blown into the lower portion of the tower through the pipe 15. The amount of the methanol vapor to be blown is preferably selected from a range such that the methyl acetate by-product can be removed almost completely. For example, the amount can be from 1 weight part to 10 weight parts with respect to 1 weight part of EVAc. The temperature of the methanol vapor can be set as the boiling point of methanol at the pressure in the reactor.

From the top portion of the first reactor, the methanol (MeOH) vapor as well as methyl acetate (MeOAc) by-product are discharged. Such a stripping of methyl acetate by blowing of a methanol vapor is effective in suppressing consumption of the alkali catalyst and in increasing the saponification rate. Preferable pressure inside the first reactor is from 0.1 MPa to 0.2 MPa, and especially preferably from 0.1 MPa to 0.15 MPa, or it can be an atmospheric pressure. Excessive rise in temperature of the methanol solution in this stage will accelerate a reaction between the methyl acetate and sodium hydroxide. However, since an EVOH having a low saponification degree has a high solubility with respect to methanol, there is no need to raise the temperature of the methanol solution.

A methanol solution containing a partially-saponified product generated due to saponification in the first reactor is delivered to the second reactor 2 by use of pump 36. This partially-saponified product has a saponification degree ranging from 60 mol % to 98 mol %, especially preferably, from 80 mol % to 95 mol %. If the saponification proceeds excessively, solubility of the EVOH is lowered excessively and polymer scales will adhere to the reactors and pipes, which may cause difficulty in a long-term continuous operation. If the saponification degree is suppressed excessively, the amount of the alkali catalyst required cannot be reduced sufficiently.

The partially-saponified product supplied to the second reactor 2 is saponified further in the reactor. Similar to the first reactor, this second reactor is supplied with a methanol solution of sodium hydroxide (NaOH/MeOH) and a methanol (MeOH) vapor respectively through the upper portion and the lower portion thereof. Similarly in this reactor, the EVOH is saponified further while methyl acetate (MeOAc) is discharged from the top portion of the reactor.

The pressure range in the second reactor should be determined to be higher than in the first reactor. Since the solubility of the partially-saponified product with respect to methanol depends on the ethylene content, the partially-saponified product may become insoluble in methanol when the ethylene content is low. Therefore, it is preferable that the pressure is suitably selected corresponding to the ethylene content of the EVOH to be produced. Preferably, the pressure in the second reactor is from 0.2 MPa to 2.0 MPa, more preferably from 0.2 MPa to 1.0 MPa, and further preferably from 0.2 MPa to 0.5 MPa.

For the apparatus shown in the drawing, the pressures in the reactors are adjusted mainly by opening and closing the valves 31 and 41. Since the amount of methyl acetate formed as a by-product in the second reactor is less than that formed in the first reactor, the by-product can be removed sufficiently even when the discharge amount from the pipe 21 is limited due to raising the pressure in the interiors of the reactors. For example, the amount of a methanol vapor blown into the second reactor is preferably about from 0.1 weight parts to 2 weight parts with respect to 1 weight part of the partially-saponified product. Similarly, the temperature of the methanol vapor can be the boiling point of methanol under the pressure within the second reactor.

In this way, a final saponified product that has been saponified further in the second reactor is taken out from the bottom portion of this reactor. The final saponified product has a saponification degree of at least 99.0 mol %, or preferably, 99.3 mol %.

According to the above-described method, an EVAc can be saponified continuously under reaction conditions adjusted corresponding to the respective stages in the saponification. Moreover, the saponification can be carried out as a homogeneous reaction in general, and thus the above-described method is advantageous from the viewpoint of obtaining an increased reaction speed.

The methanol solution of sodium hydroxide can be supplied into the towers from the middle portions of the towers through the pipes 14 and 24 as well as from the upper portions. Moreover, the supplying sections can be divided further. By supplying an alkali catalyst from two or more sections, the total amount of the alkali catalyst used can be reduced, and coloring or the like of the final product can be decreased. Divided supplying of the alkali catalyst is particularly effective for the second reactor.

The present invention is not limited to the above-exemplified apparatus and method for using two reactors, but alternatively three or more reactors connected to allow a solution to be delivered can be used. When three or more reactors are used, the above-exemplified configuration can be applied to the two reactors during the last stage. In the above embodiment, an EVAc is supplied to the first reactor. In a case in which three or more reactors are used, the reactor used as the first reactor above is supplied not with EVAc but EVOH that has been partially-saponified in a reactor of a foregoing stage.

Sodium hydroxide exemplified above as the alkali catalyst can be replaced by potassium hydroxide and alkaline metal alcoholate (e.g. sodium methylate) or the like. Any methanol solutions containing methanol as the main component can be used, and such methanol solutions can contain other alcohols having 2–4 carbon atoms, such as ethanol, n-propanol, i-propanol, n-butanol, and t-butanol.

The EVAc to be saponified can be produced by copolymerizing ethylene and vinyl acetate according to a conventional method. Although there is no limitation to the polymerization method, solvent, etc., solution polymerization using methanol as a solvent is suitable. As a polymerization catalyst, a radical initiator, e.g., various types of azonitrile-based initiators or organic peroxide-based initiators, may be used. Furthermore, a third monomer (e.g. α-olefins such as propylene, unsaturated acids such as acrylic acid, various kinds of nitrites, various kinds of amides) copolymerizable with ethylene and vinyl acetate may also be present in the EVAc. It is preferable that the third monomer is present in an amount which does not inhibit the effect of the present invention.

It is preferable that the melt index (MI) of the EVOH obtained as the final saponified product is from 0.1 to 200 g/10 min. As the MI, a value measured at 190° C. and under a load of 2160 g is used. However, with respect to an EVOH having a melting point of around 190° C. or exceeding 190° C., a plurality of measured values under the above-specified load and at temperatures of not less than the melting point are plotted as a semi-logarithmic graph with the inverse of the absolute temperature on the horizontal axis and MI on the vertical axis (logarithmic scale), and a value extrapolated to 190° C. is used as the MI.

Usually, the EVOH obtained by saponification is extruded further into a coagulation bath including water or a mixture of water and methanol, and cut into pellets. These pellets are washed, deliquored, and treated with a boron compound, a carboxylic acid compound, a phosphoric acid compound, etc. as appropriate. By including these compounds, mechanical properties, thermal stability, and the like of EVOH molded products can be improved.

The thus obtained EVOH may be molded into various forms such as films, sheets, containers, pipes, fibers and the like by melt molding. Melt molding may be effected by extrusion molding, inflation, blow molding, melt spinning, injection molding, etc. It is preferable that the melting temperature is from 150° C. to 270° C. A blend of at least two kinds of EVOH different in polymerization degree, ethylene content, saponification degree and the like may be melt molded. Furthermore, plasticizers, stabilizers, surfactants, crosslinking agents, metal salts, fillers, reinforcing agents such as various types of fibers, etc. may be added to the EVOH in advance.

A thermoplastic resin other than EVOH may be mixed with the EVOH. Examples of the thermoplastic resin include polyolefins (polyethylene, polypropylene, poly-1-butene, poly-4-methyl-1-pentene, ethylene-propylene copolymers, copolymers of ethylene and an α-olefin having at least 4 carbon atoms, copolymers of a polyolefin and maleic anhydride, EVAc, ethylene-acrylic acid ester copolymers, modified polyolefins in which these polyolefins are grafted with an unsaturated carboxylic acid or its derivative, etc.), various types of nylons (nylon 6, nylon 66, nylon 6/nylon 66 copolymers, etc.), polyvinyl chloride, polyvinylidene chloride, polyester, polystyrene, polyacrylonitrile, polyurethane, polyacetal, modified polyvinyl alcohol resin, and the like.

Furthermore, the EVOH may be formed into a laminate, for example, by co-extruding the EVOH with a thermoplastic resin such as those exemplified above. Furthermore, the EVOH may be formed into a laminate with a substrate film such as paper, plastic film, metal foil or the like, and may be coated on the surface of these substrate films by co-extrusion coating, solution coating or the like.

EXAMPLES

In the following, the present invention will be described in more detail with reference to the following non-limiting examples.

Example 1

An EVAc having an ethylene content of 44 mol % was dissolved in methanol to obtain a solution of 46 wt %. Next, the solution was supplied at 16 g/min. and a 5 wt % methanol solution of sodium hydroxide was supplied at 0.9 g/min. through an upper portion of a filling tower (hereinafter abbreviated as a tower reactor A) having a diameter of 100 mm in which Raschig rings having diameters of 15 mm was filled over a filling length of 520 mm. A molar ratio of the sodium hydroxide to a vinyl acetate unit in the EVAc was 0.017. Methanol vapor was blown into the tower reactor at 58 g/min. through a bottom portion, and methyl acetate formed as a by-product was distilled as a mixture with excess methanol through a top portion thereof. The temperature in the tower was 66° C., the pressure was about 0.1 MPa (substantially atmospheric pressure), and the average residence time of the EVAc in the tower was about 20 minutes. As a result of this reaction, a methanol solution (copolymer concentration: 23 wt %) of a partially-saponified EVOH having a saponification degree of 90.8 mol % was obtained at a rate of 21 g/min. In this solution, 0.14 wt % of sodium hydroxide remained.

The above-described methanol solution of the partially-saponified EVOH was supplied at 21 g/min. through an upper portion of a filling tower (hereinafter abbreviated as a tower reactor B) having a diameter of 150 mm in which Raschig rings having diameters of 12 mm was filled over a filling length of 770 mm, methanol vapor was blown into the tower reactor at 24 g/min. through a bottom portion, and methyl acetate formed as a by-product was distilled as a mixture with excess methanol through a top portion thereof. The temperature in the tower was 104° C., the pressure was about 0.3 MPa, and the average residence time of the EVOH in the tower was about 40 minutes. As a result of this reaction, a methanol solution (copolymer concentration: 22 wt %) of an EVOH having a saponification degree of 99.4 mol % was obtained at a rate of 20 g/min.

To the thus obtained methanol solution of EVOH, acetic acid was added at a ratio of 2 weight parts to 100 weight parts of the EVOH so as to neutralize the remaining sodium hydroxide. The neutralized methanol solution contained sodium acetate at a ratio of 1.85 weight parts with respect to 100 weight parts of the EVOH. Next, the solution was concentrated until the copolymer concentration became 45 wt %. Water was added at a ratio of 24 weight parts to 100 weight parts of the solution and the temperature was raised to 60° C. so that a homogeneous solution was obtained. This solution was extruded at a rate of 15 g/min. in a methanol-water mixed solvent (methanol/water=10/90, weight ratio) kept at 5° C. through a nozzle having a bore diameter of 2 mm and coagulated in the form of strands. The strands were cut by a cutter to obtain pellets with a length of 2.7–3.0 mm. Furthermore, these pellets were introduced into a large volume of 0.1 g/L aqueous solution of acetic acid and washed to remove remaining methanol and sodium acetate. Subsequently, the pellets were dried for 5 hours at 60° C., and further dried for 10 hours at 110° C., so that EVOH dry pellets having an ethylene content of 44 mol % and a saponification degree of 99.4 mol % were obtained. The pellets were colorless and transparent. The results are shown in Table 1.

Example 2

An EVAc having an ethylene content of 27 mol % was dissolved in methanol to obtain a solution of 46 wt %. Next, the solution was supplied at 16 g/min. and a 5 wt % methanol solution of sodium hydroxide was supplied at 0.7 g/min. through an upper portion of a tower reactor A. A molar ratio of the sodium hydroxide to a vinyl acetate unit in the EVAc was 0.012. Methanol vapor was blown into the tower reactor at 67 g/min. through a bottom portion, and methyl acetate formed as a by-product was distilled as a mixture with excess methanol through a top portion thereof. The temperature in the tower was 65° C., the pressure was about 0.1 MPa (substantially atmospheric pressure), and the average residence time of the EVAc in the tower was about 20 minutes. As a result of this reaction, a methanol solution (copolymer concentration: 22 wt %) of a partially-saponified EVOH having a saponification degree of 89.5 mol % was obtained at a rate of 20 g/min. In this solution, 0.09 wt % of sodium hydroxide remained.

The above-described methanol solution of partially-saponified EVOH was supplied at 20 g/min. through an upper portion of a tower reactor B, methanol vapor was blown into the tower reactor at 24 g/min. through a bottom portion, and methyl acetate formed as a by-product was distilled as a mixture with excess methanol through a top portion thereof. The temperature in the tower was 103° C., the pressure was about 0.3 MPa, and the average residence time of the EVOH in the tower was about 40 minutes. As a result of this reaction, a methanol solution (copolymer concentration: 21 wt %) of an EVOH having a saponification degree of 99.3 mol % was obtained at a rate of 20 g/min.

To the thus obtained methanol solution of EVOH, acetic acid was added at a ratio of 2 weight parts to 100 weight parts of the EVOH so as to neutralize the remaining sodium hydroxide. The neutralized methanol solution contained sodium acetate at a ratio of 1.60 weight parts with respect to 100 weight parts of the EVOH. Next, the solution was subjected to concentration, coagulation, washing and drying as described in Example 1, so that EVOH dry pellets having an ethylene content of 27 mol % and a saponification degree of 99.3 mol % were obtained. The pellets were colorless and transparent. The results are shown in Table 1.

Example 3

An EVAc having an ethylene content of 35 mol % was dissolved in methanol to obtain a solution of 46 wt %. Next, the solution was supplied at 16 g/min. and a 5 wt % methanol solution of sodium hydroxide was supplied at 0.8 g/min. through an upper portion of a tower reactor A. The molar ratio of the sodium hydroxide to a vinyl acetate unit in the EVAc was 0.014. Methanol vapor was blown into the tower reactor at 58 g/min. through a bottom portion, and methyl acetate formed as a by-product was distilled as a mixture with excess methanol through a top portion thereof. The temperature in the tower was 66° C., the pressure was about 0.1 MPa (substantially atmospheric pressure), and the average residence time of the EVAc in the tower was about 20 minutes. As a result of this reaction, a methanol solution (copolymer concentration: 23 wt %) of a partially-saponified EVOH having a saponification degree of 91.1 mol % was obtained at a rate of 20 g/min. In this solution, 0.09 wt % of sodium hydroxide remained.

The above-described methanol solution of partially-saponified EVOH was supplied at 20 g/min. through an upper portion of a tower reactor B, methanol vapor was blown into the tower reactor at 24 g/min. through a bottom portion, and methyl acetate formed as a by-product was distilled as a mixture with excess methanol through a top portion thereof. The temperature in the tower was 103° C., the pressure was about 0.3 MPa, and the average residence time of the EVOH in the tower was about 40 minutes. As a result of this reaction, a methanol solution (copolymer concentration: 22 wt %) of an EVOH having a saponification degree of 99.3 mol % was obtained at a rate of 20 g/min.

To the thus obtained methanol solution of EVOH, acetic acid was added at a ratio of 2 weight parts to 100 weight parts of the EVOH so as to neutralize the remaining sodium hydroxide. The neutralized methanol solution contained sodium acetate at a ratio of 1.70 weight parts with respect to 100 weight parts of the EVOH. Next, the solution was subjected to concentration, coagulation, washing and drying as described in Example 1, so that EVOH dry pellets having an ethylene content of 35 mol % and a saponification degree of 99.3 mol % were obtained. The pellets were colorless and transparent. The results are shown in Table 1.

Comparative Example 1

An EVAc having an ethylene content of 44 mol % was dissolved in methanol to obtain a solution of 46 wt %. Next, the solution was supplied at 16 g/min. and a 5 wt % methanol solution of sodium hydroxide was supplied at 3.6 g/min. through an upper portion of a tower reactor B. The molar ratio of the sodium hydroxide to a vinyl acetate unit in the EVAc was 0.066. Methanol vapor was blown into the tower reactor at 58 g/min. through a bottom portion, and methyl acetate formed as a by-product was distilled as a mixture with excess methanol through a top portion thereof. The temperature in the tower was 104° C., the pressure was about 0.3 MPa, and the average residence time of the EVOH in the tower was about 40 minutes. As a result of this reaction, a methanol solution (copolymer concentration: 23 wt %) of an EVOH having a saponification degree of 99.4 mol % was obtained at a rate of 20 g/min.

To the thus obtained methanol solution of EVOH, acetic acid was added at a ratio of 2 weight parts to 100 weight parts of the EVOH so as to neutralize the remaining sodium hydroxide. The neutralized methanol solution contained sodium acetate at a ratio of 7.40 weight parts with respect to 100 weight parts of the EVOH. Next, the solution was subjected to concentration, coagulation, washing and drying as described in Example 1, so that EVOH dry pellets having an ethylene content of 44 mol % and a saponification degree of 99.4 mol % were obtained. The pellets were yellow. The results are shown in Table 1.

Comparative Example 2

An EVAc having an ethylene content of 27 mol % was dissolved in methanol to obtain a solution of 46 wt %. Next, the solution was supplied at 16 g/min. and a 5 wt % methanol solution of sodium hydroxide was supplied at 2.1 g/min. through an upper portion of a tower reactor B. The molar ratio of the sodium hydroxide to a vinyl acetate unit in the EVAc was 0.034. Methanol vapor was blown into the tower reactor at 58 g/min. through a bottom portion, and methyl acetate formed as a by-product was distilled as a mixture with excess methanol through a top portion thereof. The temperature in the tower was 104° C., the pressure was about 0.3 MPa, and the average residence time of the EVOH in the tower was about 40 minutes. As a result of this reaction, a methanol solution (copolymer concentration: 22 wt %) of an EVOH having a saponification degree of 99.3 mol % was obtained at a rate of 21 g/min.

To the thus obtained methanol solution of EVOH, acetic acid was added at a ratio of 2 weight parts to 100 weight parts of the EVOH so as to neutralize the remaining sodium hydroxide. The neutralized methanol solution contained sodium acetate at a ratio of 4.70 weight parts with respect to 100 weight parts of the EVOH. Next, the solution was subjected to concentration, coagulation, washing and drying as described in Example 1, so that EVOH dry pellets having an ethylene content of 27 mol % and a saponification degree of 99.3 mol % were obtained. The pellets were yellow. The results are shown in Table 1.

What is claimed is:

1. A method for producing a saponified ethylene-vinyl acetate copolymer by saponifying an ethylene-vinyl acetate copolymer in a methanol solution containing an alkali catalyst, the method comprising:
   supplying from a first reactor into a second reactor a solution containing a partially-saponified product of the copolymer obtained through saponification under a predetermined pressure in the first reactor; and
   saponifying further the partially-saponified product in the second reactor under a pressure higher than the predetermined pressure in the first reactor, whereby to obtain a final saponified copolymer.

2. The method according to claim 1, wherein an ethylene content of the ethylene-vinyl acetate copolymer is from 10 mol % to 60 mol %.

3. The method according to claim 2, wherein the ethylene content of the ethylene-vinyl acetate copolymer is from 10 mol % to 30 mol %.

4. The method according to claim 1, wherein a pressure in the first reactor is from 0.1 MPa to 0.2 MPa, and a pressure in the second reactor is from 0.2 MPa to 2.0 MPa.

5. The method according to claim 1, wherein the partially-saponified product to be supplied into the second reactor has a saponification degree ranging from 60 mol % to 98 mol %.

6. The method according to claim 1, wherein the final saponified product has a saponification degree of at least 99.0 mol %.

7. The method according to claim 1, wherein the amount of alkali catalyst used is from 0.01 to 0.03 in molar ratio to an acetyl group contained in the ethylene-vinyl acetate copolymer.

TABLE 1

| | | EVOH pellet | | | Alkali catalyst | | By-product |
|---|---|---|---|---|---|---|---|
| | | Ethylene content (mol %) | Saponification degree (mol %) | Pellet color | NaOH amount (g/EVAc 100 g) | NaOH molar ratio (mol/VAc unit) | NaOAc amount (g/EVOH 100 g) |
| Examples | 1 | 44 | 99.4 | Colorless and transparent | 0.61 | 0.017 | 1.85 |
| | 2 | 27 | 99.3 | Colorless and transparent | 0.48 | 0.012 | 1.60 |
| | 3 | 35 | 99.3 | Colorless and transparent | 0.54 | 0.014 | 1.70 |
| Comparative Examples | 1 | 44 | 99.4 | Yellow | 2.45 | 0.066 | 7.40 |
| | 2 | 27 | 99.3 | Yellow | 1.43 | 0.034 | 4.70 |

VAc unit = vinyl acetate unit; NaOAc = sodium acetate

As demonstrated in the results, colorless pellets were obtained in the respective Examples. Moreover, the amounts of the saponification catalysts used were reduced to about ⅓–¼ in comparison with conventional methods. Due to the reduction in amount of the catalysts used, labors of washing to remove sodium acetate as a by-product were decreased as well.

According to the present invention, an EVOH can be produced efficiently since an EVAc can be saponified at a sufficient speed for an industrial application with a small amount of alkali catalyst. Moreover, the present invention can decrease labors of washing subsequent to a reaction, and allows a stable and continuous operation. Due to decreased amount of an alkali catalyst used, visible imperfections such as coloring can be suppressed in an EVOH obtained according to the present invention.

8. The method according to claim 1, wherein the alkali catalyst is supplied to the first reactor alone.

9. The method according to claim 8, wherein the solution supplied from the first reactor into the second reactor contains the alkali catalyst in a range from 0.005 to 0.03 in molar ratio to the acetyl group contained in the partially-saponified product.

10. The method according to claim 1, wherein the alkali catalyst is supplied to the first reactor and the second reactor.

11. The method according to claim 10, wherein the second reactor is a tower reactor divided into at least two regions in a direction from top to bottom of the reactor, and the alkali catalyst is supplied to the respective regions.

12. The method according to claim 1, wherein the first reactor and the second reactor are tower reactors.

13. The method according to claim 12, wherein a methanol solution of the ethylene-vinyl acetate copolymer and a methanol solution of the alkali catalyst are supplied through the upper portion of the first reactor, and a methanol solution containing the partially-saponified product of the copolymer and the alkali catalyst is supplied from the lower portion of the first reactor to the upper portion of the second reactor.

14. The method according to claim 12, wherein a methanol vapor is supplied through the lower portion of at least one reactor selected from the group consisting of the first reactor and the second reactor, and the methanol vapor is discharged with methyl acetate as a by-product of saponification from the upper portion of the reactor to which the methanol vapor is supplied.

* * * * *